May 11, 1965 H. E. RITTENHOUSE ETAL 3,182,504
FLUID METER
Filed May 3, 1960 3 Sheets-Sheet 1

INVENTORS
Sherman L. Wood
Howard E. Rittenhouse
BY
ATTORNEYS

` `# United States Patent Office

3,182,504
Patented May 11, 1965

---

3,182,504
FLUID METER
Howard E. Rittenhouse and Sherman L. Wood, Statesboro, Ga., assignors to Rockwell Manufacturing Company, Pittsburgh, Pa., a corporation of Pennsylvania
Filed May 3, 1960, Ser. No. 26,502
15 Claims. (Cl. 73—231)

The present invention relates to turbine meters and more particularly to improvements in such meters.

The present invention generally contemplates the provision of a special turbine meter for accurately metering and recording the flow of fluids and basically consists of a flow responsive metering turbine element disposed in a tubular housing which is adapted to be coaxially installed in a pipeline in the path of fluid flowing through the pipeline.

In meters of this type, the housing is usually flanged or otherwise suitably fixed to the pipeline containing the fluid to be metered. These pipelines are often of long length and of relatively large diameter and are often subject to extreme temperature and pressure variations. The pipe stress resulting from changing temperature and pressure conditions gives rise to complex problems of elasticity, moments and forces which cause deformation of the pipeline and also of the meter housing. As a result, the undesirable stresses which are established and transmitted to the component metering parts, bind the operative metering parts against friction free movement, thereby creating a drag of varying unpredictable magnitude on the metering turbine. As a consequence, uncompensated metering inaccuracies result from the changing temperature and pressure conditions.

To overcome these difficulties, the present invention contemplates the provision of a liner assembly having two cantilever supported shells, coaxially mounted in the meter housing and effectively floatingly supporting the moving metering elements such that deformation of the meter housing does not cause axial deformation of the liner assembly or movement thereof relative to the blades of the turbine rotor.

The present invention further contemplates a more compact, efficiently organized, and repairable turbine meter wherein the assembly and disassembly of the component metering parts is easily and quickly facilitated. In accord with the present invention, the principal component meter drive train parts serving to drive the meter register in response to flow of fluid through the blades of the metering turbine may all be made so that the same component parts can be assembled in any size meter within a given range, thereby facilitating ready interchangeability of these drive components from one size meter to another. This also permits higher volume production of these interchangeable components with resultant lower unit manufacturing cost. These component meter drive parts are compactly assembled as a unit so that replacement of these parts as a unit can be readily accomplished.

In further accord with the present invention, the meter housing is made up of two coaxial housing sections each having axially opposed end flanges which are generally similar to standard weld neck flanges used in connecting sections of pipe and on intermediate pipe section. The axially adjacent flanges on each housing section are connected together to form a continuous enclosure of tubular configuration for the operative meter parts. In order to safely withstand different ranges of line fluid pressures, the wall thickness of the meter housing is varied and rated for one of a series of standard pressures associated with a given nominal pipe size. Generally, it is the practice to vary the internal diameter of such flanges on pipe sections for pipe sizes over 12 inches in order to obtain a desired wall thickness for a given pressure rating. By this standard practice, it will be appreciated that corresponding changes in the dimensions of the operative meter parts and the inned liner assembly would be required in order to maintain the desired clearances around the rotor blades and also to maintain the proper magnitude of flow area through the meter for obtaining optimum fluid velocities.

In the present invention, however, the diameter of internal flange surfaces which serve to supportingly interfit regions on the inner liner assembly is maintained constant for the various pressure ratings of a given pipeline size and irrespective of variations in the housing wall thickness. As a result, the same liner assembly for a meter of given nominal pipe size is usable with any one of a series of housings having a variety of wall thicknesses and corresponding pressure ratings.

One advantage of the foregoing construction resides in the elimination of the necessity for manufacturing different liner assemblies of varying dimensions to correspond to the various internal pressure rating diameters of a pipeline for a given nominal pipe size. As a consequence, the number of replacement parts required to be stocked are reduced and the same liner for a given nominal pipe size is interchangeable in meters of differing pressure ratings. Thus, the dimensions of the operative parts of the meter and the clearances between the meter parts providing for passage of line fluid can be accurately maintained irrespective of changes in the internal pipeline diameter for accommodating different line fluid pressures. By means of this special structure providing for accurate fluid passage dimensions, the velocity of the line fluid flowing is accurately maintained within prescribed limits and the tendency of line fluid to leak around the meter rotor without passing through the blades thereof is substantially reduced, thereby increasing the overall accuracy of the meter.

Accordingly, a primary object of the present invention resides in the provision of a turbine meter having a novelly supported and easily assembled turbine rotor.

Another object of the present invention is to provide a novel turbine meter wherein component meter parts which are interchangeable in different size meters are mounted for assembly and disassembly as a unit.

Another object of the present invention is to provide a turbine meter having a tubular housing and a fluid flow responsive turbine rotor disposed in the housing wherein a special tubular structure supporting the turbine rotor is novelly supported on bearing surfaces formed by the interior wall of the housing such that deformations of the housing do not cause the tubular structure to deform or axially shift relative to the blades of the rotor.

A further object of the present invention is to provide a measuring instrument capable of accurately measuring rates of flowing fluid and having an instrument mechanism mounted in a thermally expansible and contractable housing which is subject to deformation wherein a novel support structure rigidly supporting the instrument mechanism in a predetermined relation to the interior of the housing isolates the mechanism from stresses induced in the housing by expansion and contraction of the housing or by deformation of a pipeline to which the housing may be connected.

A more specific object of the present invention is to provide a novel tubular turbine meter support shell composed of a pair of coaxially abutting axially elongate annular members which are independently circumferentially positioned and anchored in separable coaxially adjacent housing sections along adjacent cylindrical surfaces in bearing contact with the interior of their respective housing sections wherein the surfaces are axially spaced from regions where at least one of the annular members support the fluid flow responsive element of the turbine meter.

Still a further object of the present invention is to provide a novel turbine meter having a tubular housing, a fluid guide structure within the housing defining a venturi of hollow form and including coaxial upstream and downstream diffuser sections each having an outer shell and a central core, a turbine rotor journalled on the core of one of the sections with its blades disposed across the annular flow passage defined by the sections wherein the section shells are secured to and supported by the housing solely at their axially adjacent ends and wherein the cores are secured to and supported by the shells at the axially remote end regions of the shells opposite from their adjacent ends.

A further object of the present invention is to provide a novel annular tubular support structure for an axial flow turbine meter wherein the support structure is disposed coaxially in a tubular housing and is supported by an internal bearing surface formed on the internal wall of the housing at a predetermined region that is axially spaced from the position at which the support structure supports the flow fluid responsive element of the turbine meter.

Another object of the present invention is to provide a turbine meter having a hollow housing wherein a special hollow turbine rotor hub member is rotatably mounted concentricaly in the housing on a hollow spindle support member which is supported in cantilever fashion from the housing and through which a shaft freely extends and has a portion protruding beyond the free end of the tubular support which is drivingly connected to the hub member.

Still another specific object of the present invention is to provide a novel turbine meter having a tubular housing adapted to be axially installed in a pipeline, a fluid guide structure within the housing defining a venturi of hollow form and including coaxial upstream and downstream diffuser sections having coaxially mounted cores, a turbine rotor mounted on a hub which is journalled on the core of one of the sections with its blades disposed across the annular flow passage defined by the sections, a register mechanism for recording the flow of fluid through the turbine rotor blades and a drive train connecting the rotor hub with the register mechanism including a magnetic coupling having a follower magnet assembly connected to the register mechanism and a drive magnet assembly connected to the hub by a shaft journalled by a spindle member removably mounted rigid with the meter housing wherein the shaft, the magnetic coupling and the spindle member are removable and replaceable as a unit.

A further object of the present invention is to provide a novel lubricant system for a turbine meter having a housing, a turbine rotor journalled by bearing means in the housing, a drive train interconnecting the rotor with a register and including a drive shaft which is drive connected to the rotor and which is journalled by bearing means wherein the bearing means for the shaft and rotor are lubricated through a single fitting and a network of novelly arranged passages and chambers.

Further objects will appear as the description proceeds in connection with the appended claims and annexed drawings where:

FIGURE 3 is an enlarged fragmentary longitudinal sectional view of the meter illustrated in FIGURE 1 and showing details of the drive train interconnecting the turbine rotor with the meter register.

Figure 1:
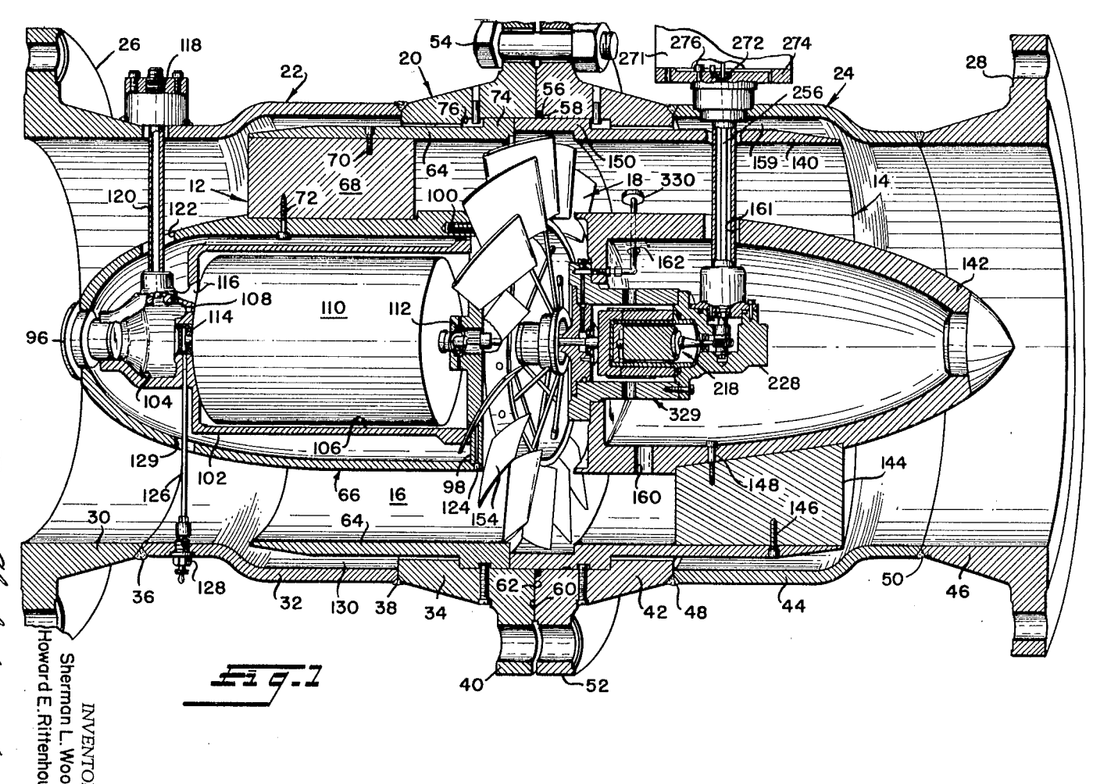
FIGURE 1 is a longitudinal sectional view of a turbine meter embodying the principles of the present invention.

Referring now to the drawings in detail, and particularly to FIGURE 1, the turbine meter of the present invention comprises fluid guide structure defining an upstream diffuser section 12 and a downstream diffuser 14 arranged in coaxial relation to define an annular flow passage 16 in which is interposed a turbine rotor assembly 18. The diffuser sections 12 and 14 are enclosed within a tubular housing structure 20 formed in two sections 22 and 24 which are separable and provided at opposite ends with suitable connection fittings such as flanges 26 and 28.

Housing section 22 comprises three parts designated 30, 32 and 34 joined by annular welds 36 and 38 to form a generally tubular housing section with a circumferentially apertured bolt flange 26 at one end and a further circumferentially apertured bolt flange 40 at the other end. Housing section 24 is similarly formed of three parts 42, 44 and 46 similarly joined by annular welds 48 and 50 to form a generally tubular housing section with circumferentially apertured bolt flange 28 at one end and a circumferentially apertured bolt flange 52 at the other end in opposed aligned relation with the bolt flange 40 of housing section 22. The housing sections 22 and 24 are fixedly connected together in coaxial relation by bolt and nut assemblies 54 extending through the aligned apertures of the flanges 40 and 52. A fluid tight seal is established between the flanges 40 and 52 by an axially compressed O-ring 56 received in an annular recess 58 formed in the end face 60 of flange 52, the O-ring 56 being compressed between the axial end wall of recess 58 and the opposed face 62 of flange 40. By this construction, a circumferential fluid tight seal is formed between flanges 40 and 52 about the tubular opening through housing 20.

Fluid meters of the type disclosed herein may, in operation, when installed in a pipeline, be subjected to a very wide variety of temperatures both internally as a result of variations in temperature of the pipeline fluid and externally due to variations in the atmospheric temperature. For example, a meter installed in a desert location will easily be subjected to a range of temperature variations well in excess of 100° F. Pipe stresses resulting from these changing temperature conditions give rise to complex problems of elasticity, moments and forces which cause longitudinal deformation of the pipeline. Since the pipeline is usually restrained against longitudinal movement at locations where the meter is installed in the line, the stresses which are created by these varying temperature conditions and which are not compensated for in the design of the pipeline, are transmitted to meter housing 20 through flanges 26 and 28 with the result that the housing deforms tending to bind the operative parts of the meter against friction free movement and thereby creating a drag of varying unpredictable magnitude upon the fluid flow responsive element. As a consequence, the strains established by severe changes in the temperature of the fluid being metered or in the surrounding ambient air temperature appreciably affect the accuracy of the meter.

Assembly of the meter in the pipeline presents a further problem in that the relatively small alignment stresses which are set up when the meter housing 20 and pipeline (not shown) are lined up and pulled together during construction of the pipeline, are not compensated for and, consequently, affect the accuracy of the meter by deforming housing 20.

In addition to the temperature and alignment stresses in the pipeline, the housing 20 itself will be subjected to external and internal changing temperature conditions and to varying internal fluid pressures depending upon the pipeline pressure. These varying conditions will cause the housing 20 to expand and contract with consequent deformation of the component parts of the meter. In meters of the type heretofore available, these variations in the size of the external housing, resulted in varying stress applied to the internal components of the meter providing a further drag upon the fluid flow responsive element varying with these conditions and resulting in metering inaccuracies.

The present invention overcomes these difficulties by, in effect, floatingly supporting the moving metering elements within the housing 20 and isolating these elements from the stresses resulting from pipeline deformation and from variations in the size of the housing 20 resulting from expansion and contraction thereof. The manner in which this is achieved will become apparent presently.

The upstream diffuser section 12 comprises an outer annular shell 64 and an inner hollow core 66, the core 66 being supported coaxially within the shell 64 by a plurality of fluid guide vanes 68, each lying in a plane passing through (i.e., including) the axis of the core 66 and the shell 64 and being secured to shell 64 by suitable machine screws 70 and to the core 66 by suitable machine screws 72. The shell 64 is provided at one end with an external radially offset annular flange 74 which, as assembled in the factory, snugly interfits in piloting relation with a radially outwardly offset cylindrical surface 76 formed coaxially in the end of upstream housing section member 34.

Figure 2:
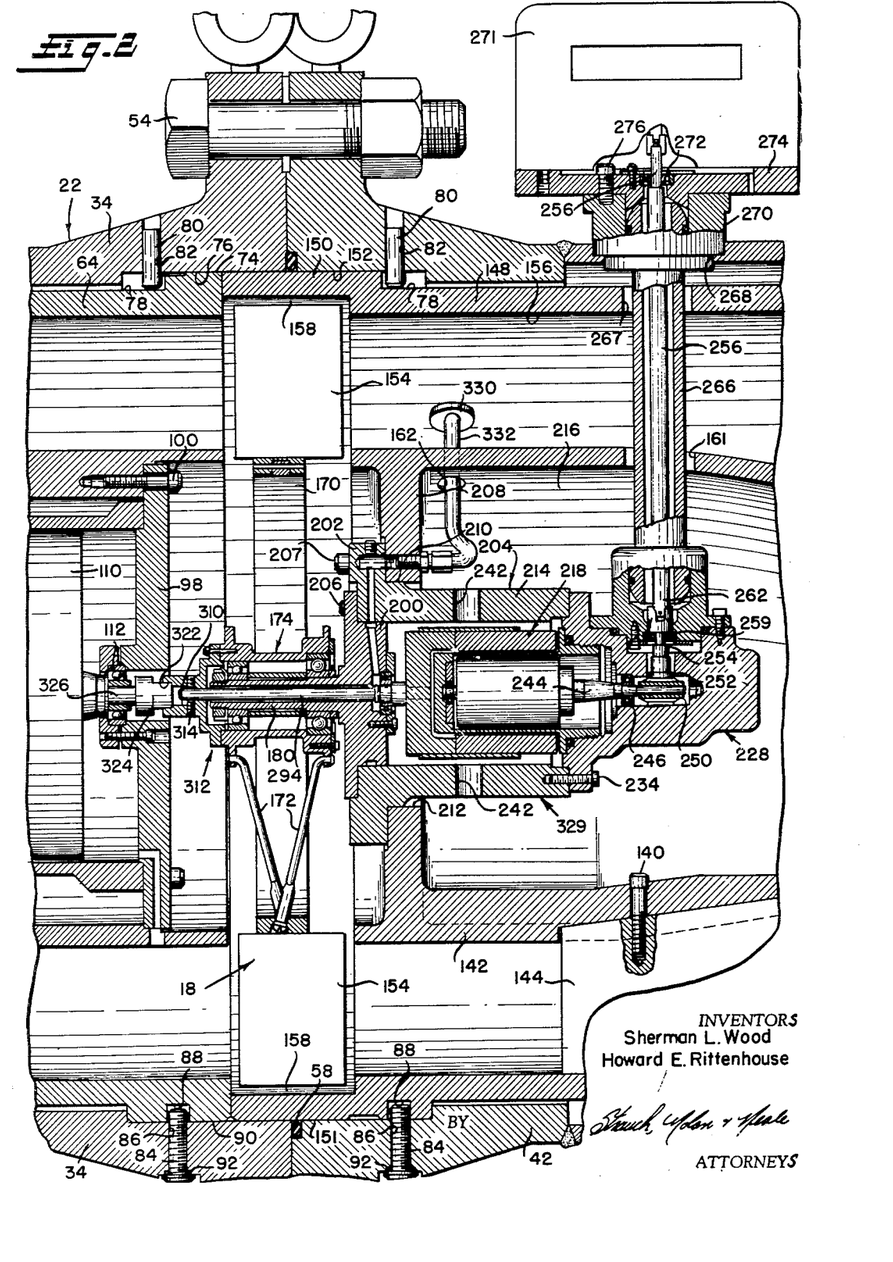
FIGURE 2 is an enlarged fragmentary longitudinal sectional view of the meter illustrated in FIGURE 1 and showing details of the rotor assembly and connections therefor.
Figure 4:
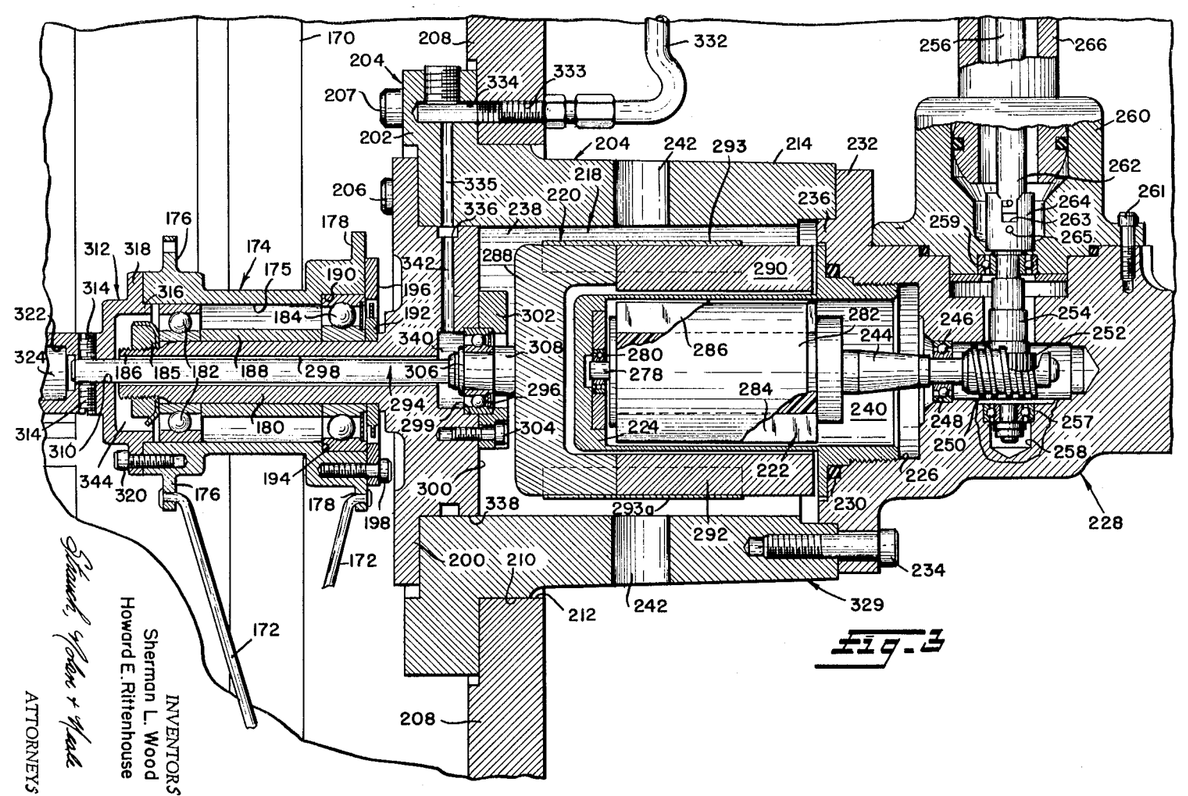

As is best seen in FIGURE 2, the circumferential position of shell 64 within the housing section 22 is established by the cooperation of an axially extending slot 78 formed in the upstream end of the annular flange 74 and a dowel pin 80 extending through an aperture 82 formed radially through the housing member 34. The diameter of dowel 80 is equal to the circumferential width of slot 78 so that when dowel 80 is in engagement with slot 78 as illustrated in FIGURE 2, the shell 64 is restrained against rotation relative to the housing member 34 and housing section 22. The shell 64 is anchored axially within member 34 by a machine screw 84 threaded through a radially extending threaded aperture 86 in member 34 and projecting at its end into a radially extending recess 88 in the radially outer cylindrical face 90 of flange 74 of shell 64. An O-ring 92 is compressed between the head of screw 84 and the opposed face of member 34 to prevent loss of fluid through the aperture 86.

As will be apparent from FIGURE 1, with the exception of the flange 74, the shell 64 extends through the housing section 22 in radially spaced relation so that while contraction or deformation of the housing section 22 will subject the flange 74 to circumferential forces, shell 64 is, along the remainder of its length, free of any axial deformation in housing section 22 and of any externally applied circumferential forces. With the supporting cylindrical surface of shell flange 74 near the center of the meter assembly, housing section 22 can be slightly deformed without causing movement of shell 64 with respect to rotor 18.

The vanes 68 by which the core 66 is supported within shell 64 are located at the end of shell 64 opposite the flange 74 so that these vanes 68, while extending approximately one half the longitudinal length of shell 64 are subjected to a minimum amount of displacement resulting from forces on flange 74 upon the contraction or deformation of the housing member 34. The vanes 68 are secured to the core 66 substantially at the center of the longitudinal length of core 66 and as will become apparent presently, the moving components disposed within the hollow core 66 are supported from the ends of core 66 so that compressive and deformation forces transmitted through vanes 68 are transmitted to the portion of core 66 well removed from the regions at which the moving parts are supported.

As is apparent from FIGURE 1, the core 66 is substantially conical in form having an insert stepped shank plug 96 at its upstream apex and a transverse end plate 98 at its downstream base and fixed to the main portion thereof by a screw 100. The core 66 houses a viscosity compensating device of the viscous drag drum type operative upon the principles disclosed in detail in copending applicaiton Serial No. 795,755, to which reference is made in the event a more detailed description than that herein given is found to be necessary to a complete understanding of this aspect of the invention. The viscosity compensator comprises a fixed hollow member 102 having an inlet chamber 104 and a cylindrical drum chamber 106 connected in fluid communication through a passage 108. The fixed member 102 is disposed coaxially within the core 66, being supported upon the base end wall 98 at its downstream end and upon the shank of insert plug 96 at its upstream end. A drum 110 is journalled coaxially within the cylindrical drum chamber 106 by an antifriction bearing assembly 112 supported at the center of the wall 98 and by a further antifriction bearing assembly 114 on the end wall 116 of the drum chamber 106 defined by member 102. The drum 110 is cylindrical in form and has an external diameter slightly less than the internal diameter of the cylindrical chamber 106 so that the external surface of drum 110 rotates in closely spaced relation to the internal cylindrical surface of the drum chamber 106. As is explained in detail in said copending application Serial No. 795,755, a small amount of fluid is tapped from the pipeline upstream of the meter and fed through a suitable strainer to the viscosity compensator.

In the present invention, the strained fluid tapped upstream of the meter is fed through an inlet fitting 118 into a pipe 120 which extends through an aperture 122 in the core 66 and opens at its discharge end into the chamber 104. Fluid flows from the chamber 104 through the inlet opening 108 into the chamber 106 where it flows between the cylindrical external surface of the drum 110 and the internal cylindrical surface of the chamber 106 to the downstream end of chamber 106 for discharge through an outlet passage 124 formed in member 98 for discharge into the annular channel 16 upstream of the rotor 18. Pipe 120 is provided with fluid tight universal end fittings of conventional form permitting limited relative axial displacement between the housing section 22 and the fixed member 102 but retaining the fluid tight connections at the opposite ends of pipe 120 without inducing stress within pipe 120. A lubricant supply duct extending between a conventional lubricant fitting 128 fixed to the outside of member 32 permits introduction of lubricant to the bearing 114 for the drum 110.

As is shown in FIGURE 1, the internal diameter of shell 64 is preferably equal to the internal diameter of the member 30 and the inlet portion of member 32 so that shell 64 for practical purposes constitutes an equal diameter extension of the pipeline and inlet portion of the housing section 22.

The annular space 130 between the exterior of shell 64 and the large diameter portion of member 32 is, as will become apparent, a dead space having no fluid outlet at its downstream end so that there is no tendency for line fluid to flow into the space 130. As a consequence, space 130 performs a further function in that it provides substantially equal fluid pressure on opposite sides of the shell 64 so that variations in pressure of the line fluid will not produce any variations in the stress transmitted through vanes 68 to the core 66. Likewise, the fluid pressure is substantially equal both internally and externally of core 66 since the interior of core 66 is open to line fluid pressure through the large opening 122 through which the pipe 120 passes and the large opening 129 through which the lubricant pipe 126 passes.

With continued reference to FIGURES 1 and 2, the downstream diffuser section 14 comprises an outer annular shell 140 coaxial with shell 64 and an inner core 142, the core 142 being supported coaxially within shell 140 by a plurality of guide vanes 144, each lying in a plane passing through the axis of core 142 and shell 140 and being secured to shell 140 by suitable machine screws 146 and to core 142 by suitable machine screws 148. Vanes 144 are in equiangularly spaced relationship about the axis of core 142 and shell 140.

Shell 140 is structurally similar to shell 64 and has an internal bore diameter equal to that of shell 64 and an annular radially offset end flange 150 forming a cylindrical outer surface 151, the outer diameter of which is equal to that of flange 74. Flange 150 axially abuts flange 74 and snugly interfits in piloting relation with an external radially outwardly offset cylindrical surface 152 which is formed coaxially in the end of downstream housing section member 42 and which is of the same diameter as cylindrical surface 76. By this structure, the assembly of shells 64 and 140 forms a substantially continuous uniformly diametered internal cylindrical surface in concentric spaced relationship with cores 66 and 142.

The means for circumferentially positioning and anchoring shell 140 is the same as that provided for shell 64 and since like reference numerals are used to identify like elements, no further description of this means will be given.

With continuing reference to FIGURES 1 and 2, the axial length of flange 150 is greater than that of flange 74 and is of such magnitude to extend axially on both sides of recess 58 and to concentrically surround rotor 18 which is provided with a set of equiangularly spaced apart blades 154. O-ring 56 is compressed against face 62 of member 20 by surface 58 of member 42 while being positioned by outer peripheral surface of flange 150 thereby preventing leakage of line fluid between the axially abutting end faces 60 and 62 of members 40 and 52.

The internal periphery of flange 150 is radially outwardly offset from the internal cylindrical peripheral wall surface 156 of shell 140 and forms with the planar end face of flange 74 an annular recess 158 which is proportioned and formed to receive the outer ends of rotor blades 154. Recess 158 functions to establish fluid turbulence between blades 154 and shell 140. The fluid turbulence thus created effects a positive turbulent seal around the rotor blades 154 to substantially reduce the leakage of fluid which would otherwise escape without being metered through the running clearance between blades 154 and shell flange 150.

By disposing the blades 154 of rotor 18 completely axially between the ends of shell 140, the possibility of causing damage to blades 154 when housing sections 22 and 24 are separated or when shell 64 is removed is substantially precluded.

As is shown in FIGURE 1, the internal diameter of shell 140 is preferably equal to the internal diameter of member 46 so that member 46 constitutes an equal diameter extension of the pipeline and outlet portion of housing section 24. As a consequence, an annular passageway formed by cores 66 and 142 with shells 64 and 140 and housing members 30 and 46, has a substantially uniform outer periphery free of exposed pockets that would cause eddy currents to be established and thereby disturb the flow of fluid through rotor 18.

The annular space 159 formed between the exterior of shell 140 and the large diameter portion of member 44 is a dead space similar to space 130 and performs the function of equalizing the fluid pressure on opposite sides of shell 140 so that variations in pressure of the line fluid will not produce variations in the stress transmitted through vanes 144 to core 142. Likewise, the fluid pressure is equal both internally and externally of core 142 as the interior of core 142 is open to line fluid pressure through openings 160, 161 and 162.

By the foregoing two-piece shell structure, it will be appreciated that axial deformation of one housing section does not materially affect the shell in the adjacent housing as shells 64 and 140 are independently anchored and circumferentially positioned to their respective housing sections 22 and 24.

When the meter is installed in a pipeline, it is standard practice to anchor the meter preferably at a point midway between flanges 26 and 28. Thus, axial deformation of the pipeline (not shown) in which the meter is installed will cause a proportionable deformation in housing 20. By mounting shells 64 and 140 in cantilever fashion, the axially opposed ends of shells 64 and 140 are free to float in housing 20 and the shells, consequently, are not deformed by stresses creating deformation of housing sections 22 and 24. As a result, the cores 66 and 142 which are supported at the free floating end portions of shells 64 and 140 are maintained in position relative to the center of housing 20 between flanges 40 and 52 and blades 154 and are not shifted or deformed by stress deformation of housing 20. Thus, the meter components supported in cores 66 and 142 are effectively isolated from stresses resulting from deformation of housing 20. The accuracy of the meter, therefore, remains unaffected by the stresses set up by pipeline deformation which is transmitted to deform housing 20 and which would otherwise cause the rotating components of the meter to drag with increased friction.

In the meter of the present invention, it will be appreciated that it is necessary to vary the thickness of housing 20 in accordance with the meter pressure rating so that the housing can withstand the rated fluid line pressures to which the meter is to be subjected. In the past, it has been the practice in construction of piping and flanges to vary the inside diameter of the pipe or the flange particularly for sizes over 12 inches in order to obtain the desired wall thickness that will safely withstand the fluid pressure for which the piping and connecting flanges are rated.

In varying the inside diameter of piping and flange components of housing 20 and particularly the internal recessed diameters of flange members 34 and 42, the accuracy of the meter when constructed without the inner liner assembly composed of shells 64 and 140 is seriously impaired. To this end it will be appreciated that slight variations in the internal diameter of the walls forming recess 158 would substantially reduce the effectiveness of the turbulent seal formed between the tips of rotor blades 154 and the bottom wall surface of recess 158 and, consequently, would cause appreciable metering inaccuracies. It is essential in a meter according to the present invention that magnitude of the clearance between the tips of blades 154 and the bottom wall surface of recess 158 be accurately maintained within extremely close tolerances in order to achieve the highly accurate measurements obtainable with this meter.

Without the inner liner assembly composed of shells 64 and 140, it is equally clear that variations of the internal diameter of housing 20 forming the outer wall of the annular flow passage defined by diffuser sections 12 and 14, will cause corresponding variations in the velocity of the fluid flowing through rotor blades 154 from the normal velocity for given conditions of temperature pressure, viscosity, etc. As a consequence, the extremely high accuracy normally obtainable with the meter of the present invention is undesirably affected. If the meter is to function properly and provide the highly accurate measurements for which it is designed, it is essential to maintain the velocity of the fluid flowing through the annular venturi within extremely close predetermined limits relative to the norm.

In order to overcome the difficulties established by the necessity of varying the wall thickness of housing 20 in accord with the pressure rating of the meter, the present invention contemplates the provision of a meter housing wherein the diameters of internal surfaces 76 and 152 of flange members 34 and 42 are the same for all the different housing wall thicknesses associated with the various meter pressure ratings of a given nominal pipe size. By means of this construction, the same inner liner assembly composed of shells 64 and 140 can be interchangeably assembled in meter housings having a variety of thicknesses corresponding to a given series of pressure ratings. Thus, it will be appreciated, that the turbulent seal clearance between rotor blades 154 and the bottom wall of recess 158 is not affected by variations in the thickness of the component parts of housing sections 22 and 24. Furthermore, by facilitating the use of identically dimensioned shells 64 and 140 for the various meter pressure ratings of a given nominal meter size, variations in the internal diameter of housing members 30, 32, 44 and 46 to obtain the necessary wall thickness that would safely withstand the rated pressure, do not affect or cause variations in the velocity of the line fluid flowing through the venturi formed by shells 64 and 140 and cores 66 and 142. As a consequence, the dimensions of the turbulent seal clearance and of the venturi flow passages can easily and accurately be maintained within the extremely close limits necessary to achieve the high metering accuracy attainable with the meter.

It is equally clear, that by constructing shells 64 and 140 with equal dimensions for interchangeable use in the different pressure rated meters of a given nominal size, high volume production is facilitated with resultant lower manufacturing costs.

As is apparent from FIGURES 2 and 3, rotor blades 154 are mounted on a rim 170 which is supported coaxially in housing section 24 by a plurality of equiangularly spaced generally radial extending spokes 172. In accord with the present invention, spokes 172 together with rim 170 and blades 154 are mounted as a unit on a hollow axle hub 174 having a through bore 175 and axially opposed annular end flanges 176 and 178 to which the inner ends of spokes 172 are alternately secured.

As best shown in FIGURES 2 and 3, hub 174 is mounted for rotation on an elongated hollow axle spindle 180 in concentric spaced apart relation thereto by means of axially spaced apart antifriction bearing assemblies 182 and 184. Bearing assembly 182 is axially retained in place on spindle 180 between a collar nut 185 secured onto a threaded terminal free end section 186 of spindle 180 and an annular spacer 188 which axially abuts the inner races of both bearing assemblies 182 and 184.

Bearing assembly 184 has its inner race mounted on spindle 180 and has its outer race fitted into a counter bore 190 formed in the right-hand end of hub 174 as viewed from FIGURES 2 and 3.

The inner race of bearing assembly 184 is axially confined between spacer 188 and a slinger ring 192 which is axially positioned between the bearing inner race and an axially facing annular shoulder formed by spindle 180. The outer race of bearing assembly 184 is axially confined between an annular shoulder 194 formed at the base of counter bore 190 and a retainer ring 196 which is secured to hub 174 as by machine screws 198.

With continuing reference to FIGURES 2 and 3, spindle 180 is cantilever supported from a transverse end plate 200 and is preferably formed integral therewith. Plate 200 is fixedly secured to an annular flange portion 202 of a support member 204 as by machine screws 206. Support member 204 is secured by screws 207 to a transverse partition wall 208 of core 142 and has an intermediate shoulder section 210 providing an axial cylindrical surface which interfits with piloting relation in an aperture 212 formed centrally in partition wall 208.

By this rotor support structure, it will be appreciated that rotor 18 is rotatably mounted on spindle 180 which is cantilever supported from end plate 208.

With continuing reference to FIGURE 2, support member 204 is provided with a terminal cylindrical section 214 which axially extends into a compartment 216 formed by the interior wall surface of core 142 and by end plate 200 and which houses a magnetic drive coupling 218.

As will be explained in greater detail presently, coupling 218 comprises a magnetic driving element 220 which is magnetically coupled to a magnetic follower element 222 through a non-magnetic tubular partition 224 forming a static fluid seal therebetween as best shown in FIGURES 2 and 3. Partition 224 is threadedly received in an axially extending annular well 226 formed in a worm gear housing 228 and is maintained in fluid tight relation therewith by an O-ring 230 positioned in an annular groove formed between partition 224 and housing 228. Housing 228 is provided with an annular flange portion 232 fixedly secured to cylindrical section 214 by machine screws 234 and with an annular skirt 236 substantially equal in diameter to the internal counter bored diameter of cylindrical section 214 to be received in a fluid tight pilot fit therein.

By this housing structure, it will be appreciated that housing 228 together with end plate 200 and cylindrical section 214 form a chamber within core 142 which is divided into two separate compartments 238 and 240 by means of partition 224 and respectively containing driving element 220 and follower element 222. Diametrically opposed apertures 242 formed radially in cylindrical section 214 connect the core compartment 216 with the driving element compartment 238 to equalize the pressures on both sides of support member 204. Since partition 224 forms a fluid tight seal with housing 228, line fluid in core compartment 216 is only allowed to enter compartment 238 and compartment 240 is sealed fluid tight against entrance of fluid therein.

The follower element 222 drives a horizontal axially extending shaft 244 journalled in an antifriction bearing assembly 246 which has its outer race press fitted into a recess 248 formed at the base of wall 226. A worm gear segment 250 is mounted on the right-hand end of shaft 244, as viewed from FIGURE 2, and constantly meshes with a worm wheel 252 fixed to a vertically extending shaft 254 which is coaxially aligned and adapted to be rotatably coupled to a register drive shaft 256.

As shown in FIGURE 3, shaft 254 is journalled at its lower end in an antifriction bearing assembly 257 mounted in a stepped bore 258 formed in gear housing 228 and at its upper end by an antifriction bearing assembly 259 received in a recess formed in an adapter piece 260 which is fixedly secured to housing 228 by means of machine screws 261. Shaft 256 is provided with an end portion 262 having opposed flat sides which interfit in a flat sided recess 263 formed in a coupling member 264 to provide for a rotatable drive connection between shaft 256 and coupling member 264 but permitting shaft 256 to be freely lifted clear of coupling member 264 for a purpose as will become apparent. Coupling 264 is suitably fixed to the upper end of shaft 254 as by set screw 265.

As best shown in FIGURE 2, register drive shaft 256 extends freely through a rigid conduit 266 which is freely received through apertures 267 and 268 formed respectively in shell 140 and housing member 44, and core aperture 161 and protrudes beyond housing section 24. Conduit 266 is provided with fluid tight universal end fittings of conventional form which are respectively mounted in a housing fitting 270 and adapter piece 260 thereby permitting limited relative axial movement between shell 140 and the fixed housing member 44 but retaining the fluid tight connection without inducing stress in conduit 266.

As is clearly shown in FIGURE 2, shaft 256 protrudes beyond fitting 270 for connection to a conventional mechanical register 271 and is journalled at its upper end by means of an antifriction bearing assembly 272 recessed in a register mounting plate 274 which is fixed to fitting 270 by machine screws 276.

With reference now to FIGURE 3, the follower magnet assembly 222 is mounted in the sealed compartment 240 for coaxial rotation at one end by a stub shaft 278 which is journaled in an antifriction bearing assembly 280. Bearing assembly 280 is disposed in a recess formed by the axially facing end wall of partition 224. Follower 222 comprises a cylindrical plastic magnetic support 282 having diametrically opposed recesses cut in the periphery thereof to receive cylindrical permanent bar magnets 284 and 286. Magnet support 282 is fixed to shaft 244 which is coaxial with stub shaft 278.

The magnetic coupling driving element 220 consists of a rigid yoke 288 preferably formed of stainless steel and having a pair of parallel arms formed with end faces that are planar and perpendicular to the axis of rotation of coupling 218. A pair of permanent bar magnets 290 and 292 abutting the planar end faces of the arms of yoke 288 are held rigidly in place with their longitudinal axes extending parallel to the yoke rotational axis by means of U-shaped sleeves 293 and 293a which coextensively fit over magnets 290 and 292 and the arms of yoke 288 and which are fixed thereto as by soft soldering to hold each magnet rigidly in place in abutting end-to-end relationship with the respective end faces of the yoke arms. The axes of magnets 290 and 292 are equally spaced from the rotational axis of yoke 288 in parallel relationship thereto and are disposed in surrounding relationship to the tubular partition 224. Thus, drive magnets 290 and 292 are rotatable in a circular path outside of partition 224 in concentric relation to the rotational path of follower magnets 284 and 286 inside of partition 224, the partition being disposed concentrically between the two paths of magnet rotation.

In order to rotate yoke 288 in response to fluid flow, a drive shaft 294 is fixed in a bore formed in the cross piece of yoke 288 in coaxial relationship with shaft 244. Shaft 294 is journalled at its right-hand end, as best viewed from FIGURE 3, by an antifriction bearing and seal assembly 296 and extends coaxially through the axial bore 298 of spindle 180, having a portion extending beyond the left-hand end face of the spindle. Bearing assembly 296 is received in an annular recess 299 formed in end face 300 of end plate 200. The outer race of bearing 296 is confined between an annular retainer 302 which is fixed to plate 200 as by machine screws 304 and the bottom annular wall of recess 299. The inner race of bearing 296 is axially clamped between a retainer ring 306 fixed to shaft 294 and an axially facing abutment shoulder formed by an enlarged diameter portion 308 of shaft 294, the opposite axially facing abutment surface of which is in bearing contact with the cross piece of yoke 288.

With continued reference to FIGURE 3, the left-hand end of shaft 294 extending beyond spindle 180, axially and freely protrudes into a bore 310 formed in a hub cap member 312 and is fixedly secured therein by means of a pilot fit and diametrically opposed set screws 314. Hub cap 312 is provided with a terminal axially extending cylindrical skirt 316 which is received, with a pilot fit, in bore 175 of axle hub 174 and with a flat sided annular flange portion 318 adjacent skirt 316. Flange portion 318 axially abuts the planar end face of axle hub 174 and is fixed thereto as by machine screws 320.

As best shown in FIGURES 2 and 3, hub cap 312 is provided with a counter bore 322 which is formed coaxial with bore 310 and which receives the shank portion of a coupling 324 with a non-rotatable press fit. Coupling 324 is fixedly secured into the free end of a stub shaft 326 coaxially fixed to drum 110 and journalled in bearing 112.

By this structure, it will be appreciated that shaft 294 is rotated in response to fluid flow through turbine blades 154 and is concomitantly retarded from rotating by the viscous action of the line fluid flowing over drum 110 as hereinbefore explained. Rotation of shaft 294 is imparted to yoke 288 of magnetic coupling 218. The relation between the driving magnets 290 and 292 and the follower magnets 284 and 286 is such that, as shaft 294 is rotated, the follower assembly 222 will be caused to rotate either by magnetic attraction of the follower magnets 284 and 286 to the driving magnets 290 and 292 or by repulsion of the follower magnets 284 and 286 from the driving magnets 290 and 292, depending upon the relative orientation of the poles on the magnets. Rotation of the follower 222 imparts rotation to shaft 244 and worm 250 which is fixed to the end thereof exteriorly of bearing 246 and which meshes with worm wheel 252. As a consequence, rotation is imparted to shaft 254 which is coupled to register shaft 256 as previously described.

From the foregoing description, it is apparent that partition 224 and housing 228 seals compartment 240 from fluid flowing through apertures 242 into compartment 238 so that the rotary motion of follower 222 is transmitted to register shaft 256 without the use of any dynamic fluid seals such as stuffing boxes and thus provides a fluid tight register assembly.

It is further apparent from the foregoing description that spindle 180, shaft 294, support 204, magnetic coupling 218, housing 228, shaft 254, coupling 264 and adapter piece 260 are all removable as a unit through aperture 212 of core wall 208 and constitute a drive train assembly 329 for rotating register shaft 256 in response to fluid flow through blades 154. The removal of drive train assembly 329 is readily accomplished by separating housing sections 22 and 24 to provide access to rotor assembly 18. Set screws 314 securing drive shaft 294 to hub cap 312 are loosened and screws 320 are removed to disconnect hub cap 312 from axle hub 174. Rotor assembly 18 including blades 154, spokes 172 and axle 174 are then preferably removed as a unit by removing nut 185 to insure against damage to blades 154 while removing the drive train. Register housing 271 and register base plate assembly 274 is then removed to provide access to conduit 266 and shaft 256. Both conduit 266 and shaft 256, being axially retractable, are lifted clear of adapter piece 260. By now removing screws 207, the components of drive train 329 are removed as a unit through aperture 212.

The foregoing component parts of drive train 329 which are removable as a unit, and also axle hub 174, hub cap 312 and nut 185 are all made so that the same component parts can be assembled in any size meter within a preferred 10 inch to 16 inch range. As a consequence, drive train 329 is interchangeable in the various sizes of meters and the necessity of manufacturing different size component parts for each meter size is eliminated. In addition, this meter drive train may be removed as a single unit from a meter of one size and assembled in a meter of a different size. Thus, the only operative metering components that vary in size according to the pipe diameter size of the meter are the viscosity drum 110, the diffuser sections 12 and 14 and the blades 154, rim 170 and spokes 172 of rotor assembly 18. Thus, the manufacture of different sizes of meters particularly within the 10 inch to 16 inch range is easily facilitated and the problems involved in stocking parts for the various sizes of meters is greatly simplified in addition to facilitating mass production with resultant lowering of manufacturing costs.

In order to lubricate bearings 296, 182 and 184, a lubricant fitting 330 is provided, as shown in FIGURE 1, and is fixed to housing section 24 in upstanding relationship at an angle of approximately 45 degrees from a vertical plane passing through the longitudinal axis of the meter.

Lubricant introduced into fitting 330 is supplied by pressure through a downwardly inclined pipe 332 which interconnects fitting 330 with an axially extending passage 333 formed in wall 208 of core 142 as best shown in FIGURE 3. Passage 333 is axially aligned with an axial passage 334 formed in support member 202 which is intersected by a radially extending channel 335. Channel 335 communicates with a circumferential groove 336 formed in the surface 338 of the portion of end plate 200 interfitting with the axial bore of member 202. By this construction support member 202 may be removed without disconnecting pipeline 332.

Lubricant supplied to groove 336 is furnished to a lubricant well 340 formed coaxial with spindle bore 298 at the base of recess 299 by means of at least one radial passage 342 connected at its outer end to groove 336 and at its inner end to well 340. By this passageway construction, lubricant introduced into well 340 is forced into recess 299 and lubricates bearing 296. Lubricant is also forced from well 340 into bore 298 between the peripheral wall of bore 298 and the outer periphery of shaft 294. The lubricant passing through bore 298 flows into a chamber 344 formed by hub cap 312 and axle hub 174 and then into bore 175 to thereby facilitate lubrication of bearings 182 and 184.

From the foregoing description, it will be appreciated that only a single fitting 330 and one connecting line 332 is required to lubricate bearings 182, 184 and 296 serving to journal axle hub 174 and shaft 294 respectively and that the foregoing component drive train parts which are assembled and disassembled in the meter as a unit, may be removed without necessitating the disconnection of lubricant line 332.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a turbine meter, a tubular housing, a fluid guide structure within said housing defining a venturi passage and comprising separate axially aligned upstream and downstream diffuser sections each having an outer shell and a central core, a turbine metering rotor disposed between the cores of said diffuser sections and being journalled on the core of one of said sections with its blades disposed across the venturi passage defined by said sections, said section shells being independently secured to and supported by said housing solely at their adjacent ends and said cores being secured to and supported by said shells solely at the end regions of said shells remote from said adjacent ends.

2. In a fluid meter comprising a housing and a fluid flow responsive metering device movably mounted in said housing, a drive train providing for the transmission of mechanical movement from said device to a rotatable element having at least a portion disposed exteriorly of said housing, a fluid tight hollow static seal structure extending from the exterior of said housing to a position adjacent said metering element and terminating at said position in an imperforate wall of non-magnetic material, a magnetic drive coupling operative through said wall and comprising a pair of magnetically coupled elements disposed from opposite sides of said wall, one of said elements being mechanically connected to said flow responsive device for concomitant movement therewith and being exposed to the metered fluid, the other of said elements being mechanically coupled to drive said rotatable element, said static seal structure including a hollow shaft housing unit through which said rotatable element extends, said hollow shaft housing unit being universally pivotally mounted in fluid tight relation to said housing at one end and universally pivotally mounted in fluid tight relation to said wall at the other end for permitting limited relative movement between said wall and said housing while maintaining the fluid tight integrity of said static fluid seal structure.

3. In an instrument having an expansible and contractible housing and an instrument mechanism disposed in operative relation therein for determining a measurable position, means for rigidly supporting said mechanism in a predetermined relation in the interior of said housing while maintaining said instrument mechanism free of stress induced by axial and radial expansion and contraction of said housing, said support means comprising inner and outer axially elongated radially spaced apart coaxial members arranged to define an annular fluid flow passage therebetween, coacting means on said housing and the outer of said members rigidly supporting said outer member relative to said housing solely at one peripheral region on said outer member, means rigidly supporting said inner member on said outer member solely at a region on said outer member spaced axially from said peripheral region, and means mounting said instrument mechanism on said inner member in a region axially spaced along said inner member from the support connection between said inner and outer members.

4. In a flow measuring meter having an axially and radially expansible and contractible housing and a movable flow responsive metering element mounted in said housing, means for supporting said metering element in a predetermined relation to the interior of said housing while maintaining said metering element free of stress induced by expansion and contraction of said housing, said support means comprising inner and outer radially spaced apart coaxial members arranged to define an annular fluid flow passage therebetween, the outer of said members being rigidly peripherally cantilever supported on the housing adjacent one of its ends, the inner of said members being supported solely upon the free end of said outer member, said metering element being supported upon said inner member adjacent said one end of said outer member in axially spaced relation to the region in which said inner member is supported upon said outer member and being movable in response to fluid flow through said annular fluid flow passage.

5. A turbine meter insert assembly adapted for insertion in operative relation in any of a series of centrally separable external turbine meter housings of similar central internal cross section for differing metering applications, said insert assembly comprising an upstream diffuser section and a downstream diffuser section, each of said sections comprising a tubular shell and a coaxial core, said sections when disposed in axially aligned relation defining a venturi passage of hollow form through which fluid flows for metering, a peripherally bladed turbine metering rotor journalled coaxially on the core of one of said sections with its blades disposed in said passage so that axial movement of fluid through said passage will impart rotation to said rotor, a drive train in the core of said one section having its input drive connected to said rotor and a rotatable output member, the core and shell of said one section having aligned apertures therein in alignment with said output member and through which a drive shaft can extend and be drive coupled to said output member, the adjacent ends of said section shells having externally enlarged portions defining together an external cylindrical piloting surface and axially spaced shoulders whereby the radial and axial positions of said assembly within any housing of such a series may be established.

6. The combination defined in claim 5 wherein the blades of said turbine rotor are disposed completely between the opposite axial ends of said shell of said one section and said sections are arranged relative to each other so that upon separation of said sections, the blades of said turbine rotor are protected from injury.

7. In a fluid meter having a housing, a turbine rotor rotatably mounted in said housing, and means adapted to be driven by said rotor to register the quantity of fluid flowing through said housing and including a rotatable member journalled in said housing, a drive train assembly providing for transmission of mechanical movement from said turbine rotor to said means driven by said rotor and being removably mounted in said housing as a unit, said drive train assembly comprising: a support removably rigidly secured in said housing, a hollow spindle rigidly cantilever mounted on said support and axially extending substantially coaxially in said housing, said turbine rotor being removably journalled concentrically on said spindle, a rotatably mounted drive shaft extending freely through said spindle and rigidly removably connected for rotation with said rotor externally of the unsupported end of said spindle, and means mounted on said support for drivingly coupling said rotatable member and said drive shaft including a stub shaft journalled coaxially with said rotatable member and a coupling member secured to said stub shaft, said coupling member being operable to establish an axially slidable rotating drive connection with said rotatable member permitting said rotatable member to be axially disengaged from said coupling member.

8. The fluid meter as defined in claim 7 wherein said turbine rotor comprises a tubular hub, a plurality of peripheral turbine blades, and a plurality of spokes fixed at their inner ends and projecting outwardly therefrom providing a support for said blades at their outer ends, said hub being journalled on said spindle in concentric spaced relationship thereto.

9. The fluid meter as defined in claim 8 wherein a connection is provided between said drive shaft and said hub comprising an end plate peripherally fixed to said hub and centrally fixed to said drive shaft.

10. The fluid meter as defined in claim 7 wherein said means drivingly coupling said rotatable member and said drive shaft comprises a magnetic coupling having a driving magnet and a driven magnet mounted for rotation on said support in concentric inner and outer longitudinally aligned paths, said driving magnet being drivingly connected to said drive shaft and gear means drivingly connecting said driven magnet with said stub shaft whereby rotary movement of said rotor is mechanically transmitted to drive said rotatable member.

11. A fluid meter drive train adapted for interchangeable assembly as a unit in a variety of different sizes of fluid meters and adapted to transmit mechanical movement from a movable fluid flow responsive device in said meter to a driven structure associated with said meter for registering the mechanical movement transmitted thereto, comprising: a rigidly mounted spindle member having an axial through bore, a rotatable drive shaft extending through said bore and having opposite end portions protruding beyond said bore, means on one of said drive shaft end portions for rigidly drivingly connecting said device to said drive shaft, a hollow housing structure providing a chamber and adapted to be fixedly mounted in said meter, a magnetic coupling mounted in said housing structure chamber and having a driver drivingly connected to the other of said drive shaft end portions and a follower magnetically coupled to said driver, and means mounted in said housing structure and adapted to drivingly interconnect said follower with said driven structure.

12. A fluid meter drive train assembly adapted for interchangeable assembly as a unit in housings of a variety of different sizes of fluid meters and adapted to transmit mechanical movement from a turbine rotor assembly rotatably mounted in said meter to a register drive assembly associated with said meter for registering the mechanical movement transmitted thereto, comprising: a hollow housing structure adapted to be removably secured in the housing of said meter, a spindle member rigidly cantilever supported exteriorly of said housing structure and having an axial through bore, said spindle member being adapted to rotatably mount said rotor assembly, a drive shaft extending freely through said spindle bore and having opposite end portions protruding beyond said bore, the one of said drive shaft end portions exteriorly of the unsupported end of said spindle being adapted to be rigidly drivingly connected to said rotor assembly and the other of said drive shaft end portions extending into said housing and journalled for rotation therein, a magnetic coupling having at least a pair of driving and driven axially polarized permanent magnets mounted for rotation in said housing in concentric inner and outer longitudinally aligned annular paths, said driving magnet being drivingly connected to said other drive shaft end portions, and means adapted to drivingly interconnect said driven magnet to said register drive asembly comprising a shaft mounted in said housing for rotation with said driven magnet and gear means adapted to engage with mating gear means associated with said register drive assembly.

13. In a turbine meter, a tubular housing, a fluid guide structure within said housing defining a venturi of hollow form and comprising axially aligned upstream and downstream diffuser sections each having an outer shell and a central hollow core, said section shells being secured to and supported by said housing solely at their adjacent ends and said cores being secured to and supported by said shells at the axially remote end regions of said shells; a turbine rotor mounted between the cores of said sections with its blades disposed across the annular flow passage defined by said sections; means for journalling said rotor on the core of one of said sections comprising a transverse wall formed by the core of said one section and having a central aperture communicating with the interior of said core substantially coaxial with the longitudinal axis of said housing, a support housing structure mounted on said wall and having a hollow cylindrical portion projecting coaxially through said aperture into the interior of said core, an axle member secured to said support housing structure and having a hollow cantilevered spindle projecting between said cores and externally of said housing support structure in substantially concentric relationship with said housing, anti-friction bearing assemblies mounted on said spindle and rotatably supporting the hub of said turbine rotor; a register mounted on the exterior of said housing for registering the quantity of fluid passing through said blades; and drive means operatively connecting said register to said turbine rotor comprising a drive shaft extending freely through said spindle, bearing means mounted in said housing structure and journalling said drive shaft at the supported end of said spindle, a hub cap member connecting the end of said drive shaft extending externally of the unsupported end of said spindle with the hub of said rotor, a fluid tight partition in the chamber formed by said hollow cylindrical portion and dividing said chamber into radially inner and outer compartments, a plurality of permanent drive magnets in one of the compartments and fixed concentrically to said drive shaft, and a like plurality of driven magnets mounted for concentric rotation in the other of said compartments about an axis concentric with the axis of rotation of said drive shaft and being magnetically coupled to said drive magnets whereby said drive magnets are operable upon rotation of said drive shaft to impart concomitant rotation of said drive magnets, a gear mechanism mounted in said support housing structure and having an input drive connected to said driven magnets and an output, a register shaft rotatably mounted in said meter housing and extending at one end exteriorly of said housing for connection to said register, the other end of said register shaft extending into said support housing structure, and coupling means establishing an axially slidable rotating drive connection between said other end of said register shaft and the output of said gear mechanism; and means for lubricating said bearing means and said bearing assemblies comprising a single lubricant fitting mounted on the exterior of said housing; a passage formed in the transverse wall of said core and having an inlet port and an outlet port, a conduit connecting said fitting with said passage outlet port, means forming a passageway in said support housing structure having a port at one end in registry with said passage outlet port and a discharge port at its other end, a lubricant well formed in said housing structure axially between said spindle bore and said drive shaft bearing means in communication with said spindle bore and said drive shaft bearing means and passageway means formed in said axle member interconnecting said passageway discharge port with said lubricant well, whereby lubricant introduced into said well lubricates said drive shaft bearing means and is free to flow through said spindle bore between the outer periphery of said drive shaft and the internal wall of said spindle bore, said hub cap member and said rotor hub forming a lubricant chamber for containing lubricant passing through said spindle bore to lubricate said rotor hub bearing assemblies.

14. In a turbine meter, a tubular housing, a fluid guide structure within said housing defining a venturi passage and comprising separate axially aligned upstream and downstream diffuser sections each having an outer shell and a central core, a turbine metering rotor disposed between the cores of said diffuser sections and being journalled on at least one of said cores with its blades disposed across said venturi passage, the shells of said sections being separately and independently solely peripherally supported by said housing only at their adjacently disposed ends, said cores being secured to and supported by the said shells solely at regions of said shells axially remote from said adjacently disposed ends.

15. In a fluid meter having a housing, a turbine rotor rotatably mounted in said housing, and means adapted to be driven by said rotor to register the quantity of fluid flowing through said housing and including a rotatable member journalled in said housing, a drive train assembly providing for transmission of mechanical movement from said turbine rotor to said means driven by said rotor and being removably mounted in said housing as a unit, said drive train assembly comprising: a support removably rigidly secured in said housing, a hollow spindle rigidly cantilever mounted on said support and axially extending substantially coaxially in said housing, said turbine rotor being removably journalled concentrically on said spindle, a rotatably mounted drive shaft extending freely through said spindle and rigidly removably connected for rotation with said rotor externally of the unsupported end of said spindle, means mounted on said support for drivingly coupling said rotatable member and said drive shaft and including a magnetic coupling, a stub shaft journalled coaxially with said rotatable member and a coupling member secured to said stub shaft, said coupling member being operable to establish an axially slidable rotating drive connection with said rotatable member permitting said rotatable member to be axially disengaged from said coupling member, said magnetic coupling having a driving magnet and a driven magnet mounted for rotation on said support in concentric inner and outer longitudinally aligned paths, said driving magnet being drivingly connected to said drive shaft and gear means drivingly connecting said driven magnet to said stub shaft whereby rotary movement of said rotor is mechanically transmitted to drive said rotatable member, anti-friction bearing means journalling said drive shaft in said support adjacent the supported end of said spindle, a lubricant fitting secured to and extending exteriorly of said housing, a partition wall fixed to said housing in spaced relationship to the interior wall surface of said housing and mounting said support, means defining a passageway in said partition wall having an inlet port and an outlet port, conduit means connecting said inlet port with said fitting and passageway means in said support registering with said outlet port for supplying lubricant introduced through said fitting to said anti-friction bearing means.

References Cited in the file of this patent

UNITED STATES PATENTS

| | | |
|---|---|---|
| 1,559,155 | Bullock | Oct. 27, 1925 |
| 1,570,214 | Fox | Jan. 19, 1926 |
| 2,654,248 | Newton | Oct. 6, 1953 |
| 2,683,224 | Cole | July 6, 1954 |
| 2,713,261 | Butterworth et al. | July 19, 1955 |
| 2,728,893 | Bartelink | Dec. 27, 1955 |
| 2,770,131 | Sparling | Nov. 13, 1956 |
| 2,817,231 | Barstow | Dec. 24, 1957 |
| 2,848,893 | Tuffet et al. | Aug. 26, 1958 |
| 2,907,208 | Taylor | Oct. 6, 1959 |
| 2,914,945 | Cleveland | Dec. 1, 1959 |

FOREIGN PATENTS

| | | |
|---|---|---|
| 466,628 | Great Britain | June 1, 1937 |
| 728,132 | Germany | Nov. 20, 1942 |
| 150,044 | Australia | Feb. 13, 1953 |
| 1,164,587 | France | Oct. 13, 1958 |
| 894,333 | Great Britain | Nov. 12, 1958 |

UNITED STATES PATENT OFFICE
CERTIFICATE OF CORRECTION

Patent No. 3,182,504                            May 11, 1965

Howard E. Rittenhouse et al.

It is hereby certified that error appears in the above numbered patent requiring correction and that the said Letters Patent should read as corrected below.

Column 2, line 4, for "inned" read -- inner --; column 13, lines 73 and 74, for "position" read -- condition --.

Signed and sealed this 12th day of October 1965.

(SEAL)
Attest:

ERNEST W. SWIDER                           EDWARD J. BRENNER
Attesting Officer                              Commissioner of Patents